Dec. 29, 1931.  J. W. HOOLEY  1,838,516
SECTIONAL CABINET FOR ELECTRICAL CONNECTIONS
Filed May 18, 1931  2 Sheets-Sheet 1
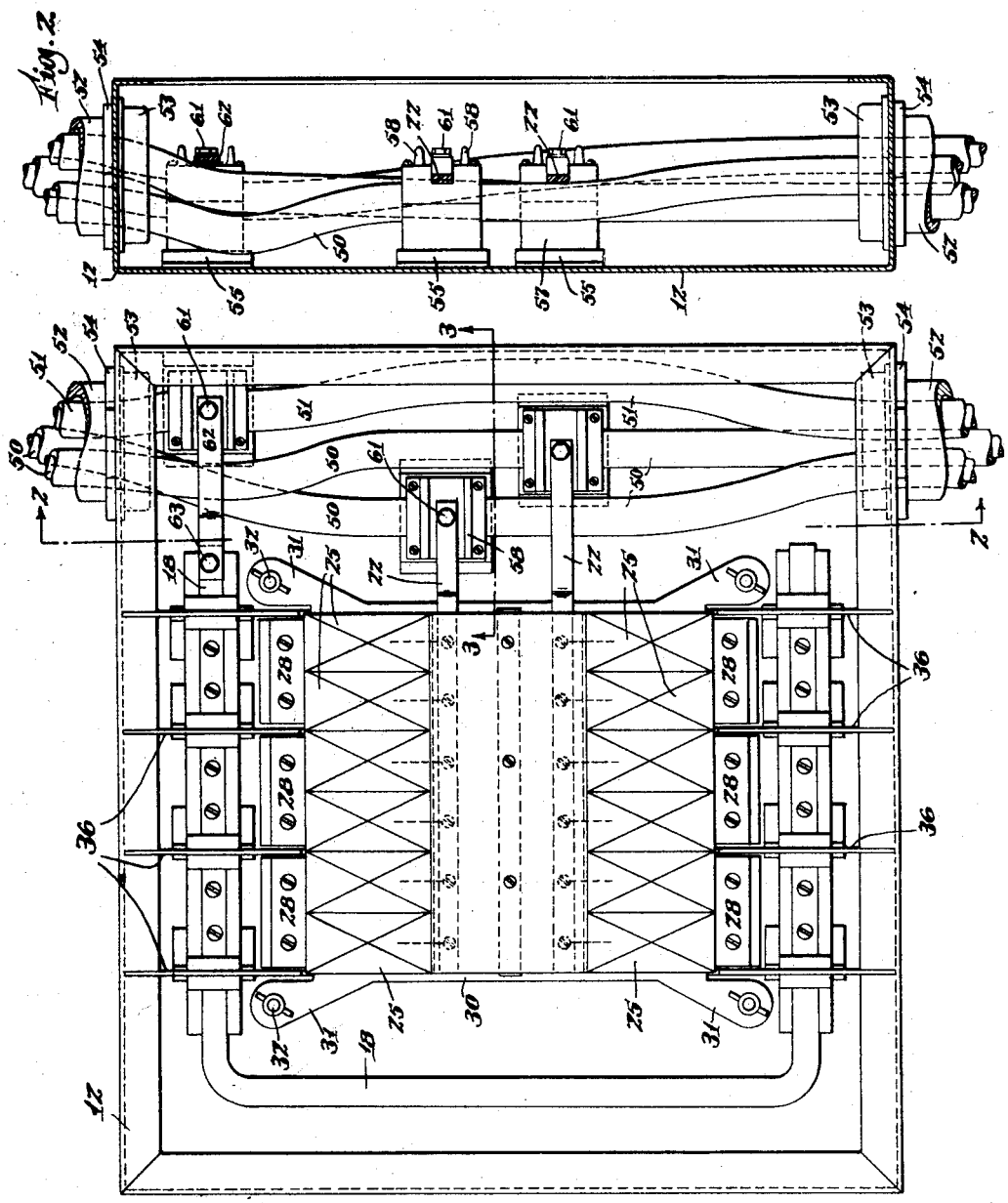
Inventor
John W. Hooley
by *attorney*

Dec. 29, 1931.  J. W. HOOLEY  1,838,516
SECTIONAL CABINET FOR ELECTRICAL CONNECTIONS
Filed May 18, 1931  2 Sheets-Sheet 2
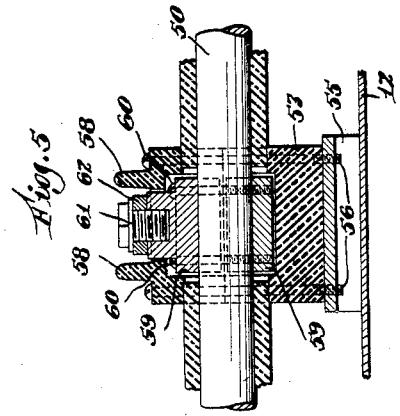
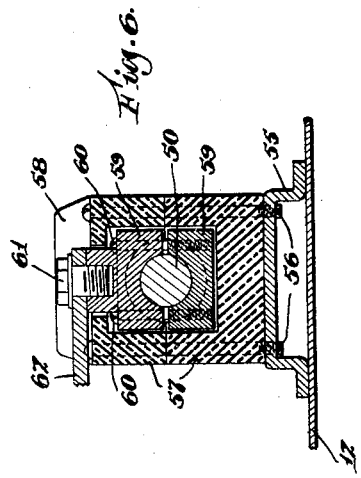
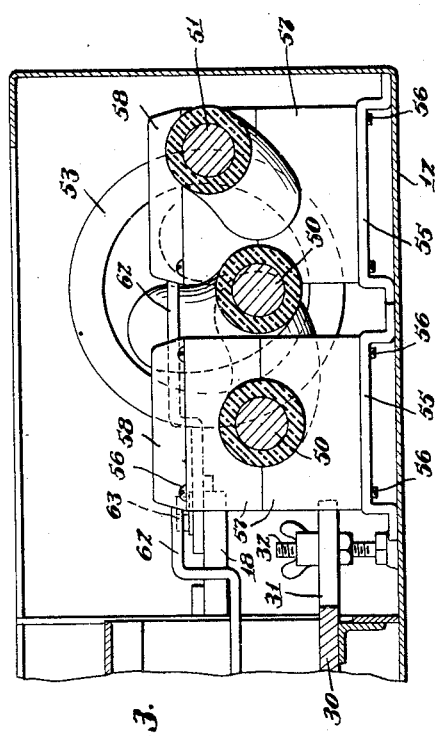
Inventor
John W. Hooley
by  N.H. Harrison
Attorney Patented Dec. 29, 1931

1,838,516

REISSUED

UNITED STATES PATENT OFFICE

JOHN W. HOOLEY, OF LARCHMONT, NEW YORK, ASSIGNOR TO HIXLEY ELECTRIC COMPANY, OF NEW YORK, N. Y., A CORPORATION OF NEW YORK

SECTIONAL CABINET FOR ELECTRICAL CONNECTIONS

Application filed May 18, 1931. Serial No. 538,329.

This invention relates to boxes or cabinets for the accommodation and reception of panel boards, distributing boards, switch boards, interconnection boxes for signal systems such as telephones, bells, and any members or devices that may be used for distributing light and power, wiring connections, or wires or conductors.

At present, those interested in electrical work such as electrical engineers, manufacturers and underwriters, limit the number of conductors in conduits, and such conductors are so limited until they enter a panel or connection box, or so-called pull box or junction box. Then the conductors are generally crossed and run in haphazard manner in order to make connection to the circuit protecting or other devices in the panel cabinet.

An improved multiple circuit electrical distributing device for use in overcoming objections or difficulties encountered in making such installations as referred to, is described and claimed in Letters Patent No. 1,796,521 issued to me March 17, 1931, and improvements therein are described and claimed in my application filed March 12, 1931, Serial No. 521,949, of which application the present one is a continuation in part.

Heretofore, so far as I am aware, the connections between the main cables and the bus bars or other conductors in cabinets containing circuit protecting or other devices, have been complicated, and require operations such as wedging, soldering, or taping. And it has been difficult to so anchor the cables as to properly sustain them and prevent the weight of the cables, or vibrations of the building, or other force, from effecting such strain as to pull the cables out of position. Such prior methods of effecting the connections of the cables are generally unsatisfactory, and produce unsightly results.

The object of my present invention is to provide cabinets for electrical mechanism or devices with improved connections which so support the cables that they can not slip.

With said object in view, my invention consists in the construction and combination of parts substantially as hereinafter described and claimed.

Of the accompanying drawings:—

Figure 1 is a front elevation of my improved cabinet in one of its forms, the usual front door or panel thereof being omitted.

Figure 2 represents a section on line 2—2 of Figure 1.

Figure 3 represents a section on line 3—3 of Figure 1, on a larger scale.

Figure 4 is a view similar to a portion of Figure 1 on a larger scale.

Figures 5 and 6 represent sections on lines 5—5 and 6—6 respectively, of Figure 4.

Similar reference characters indicate similar parts or features in all of the views.

Referring first to Figure 1, the box or cabinet 12 contains a neutral bar 18, bus bars 22, circuit controlling devices indicated diagrammatically at 25, contact plates 28, a supporting plate 30 for the circuit controlling devices 25, said plate 30 having corner portions 31 through which threaded studs 32 pass to hold the plate in position, and barrier or division strips 36. As so far described, the structure is illustrated the same as in the application hereinbefore referred to, the reference characters being the same as in said application. Further description of the contents of the cabinet herein is unnecessary because the present invention relates to the main cables and the supporting connections thereof which will now be described.

At one side of the members already described, is a vertical space or raceway to accommodate the cable conductors and the supporting devices therefor. In the particular embodiment of the invention chosen for illustration herein, there are three cables two of which are designated at 50, 50, for connection to the bus bars 22, and the third one designated at 51 for connection to the neutral bar 18. The conduits 52 through which the cables lead to the cabinet are secured thereto as by means of bushings 53 at their inner ends inside the bottom and top walls of the cabinet, and suitable lock nuts 54 outside said walls. Each cable is illustrated as having the usual protective sheathing, which sheathing, when the cable is to be installed, is removed in the proper location to bare that portion of the core which is to be gripped by conducting members of the supporting blocks or the connection now to be described, and one of which is illustrated in detail in Figures 4, 5 and 6. A description of one will suffice for all three.

Permanently secured to the rear wall of the cabinet, as by welding or otherwise, is a foot piece 55 on which is mounted, and secured by screws or bolts 56, two oppositely recessed blocks 57 of insulating material. Projecting from the top of the upper block 57 are ribs 58 the purpose of which is to prevent any cable which may cross over the top of the connecting support, from contact with the screws 56 or the stud bolt 61 presently described.

Mounted in the space which exists by the presence of the recesses in the insulating blocks 57 are two blocks 59 of copper, brass, or other suitable conducting material, said block having screws 60 by which they are held firmly with their inner concave portions gripping the bared portion of the cable mounted therein.

The upper block 59 has a threaded socket for a stud bolt 61 which latter passes through an aperture in one end of a connecting bar 62 the other end of which (Figs. 1 and 3) is secured by a stud bolt 63 to the end of the neutral bar 18. A similar bar or strip might connect each of the two bus bars 22 with stud bolt 61, but I have chosen to illustrate, in Figure 1, that the said bus bars may have integral extensions to reach the stud bolts.

It will now be understood that I have provided a combination cable support and cable connector which is anchored securely by means of the metal strip or foot piece 55 which is spot welded or secured to the cabinet in other approved manner, and a cabinet may come to a building with said parts already in place, and with the bus bars and other members also in place. To effect installation, the insulation on the cable is removed at the proper point, the upper block 57 and the upper block 59 are removed and after laying the cable in the cavity then replaced, the screws 60 being actuated to cause the blocks 59 to firmly grip the bared portion of the cable, and act as an anchor to hold the cable in place and also provide the necessary electrical connection. In other words, the cable is gripped directly on its copper core and is held against slippage, and the entire electrical connection consisting of the blocks 59, and bus bars &c., is securely held in place and protected electrically and mechanically by the structure of the cabinet itself.

Having now described my invention, I claim:—

1. A cabinet for electrical mechanisms, having a cable conductor, a mechanical support and an electrical connection at a single point on said conductor, the means providing for the electrical connection being entirely independent of the mechanical support.

2. A cabinet for electrical mechanisms, having a cable conductor, a frictionally gripping mechanical support and an electrical connection at a single point on said conductor, the means providing for the electrical connection being entirely independent of the mechanical support.

3. A cabinet for a series of electrical mechanisms or devices, said cabinet including bus bars and cable conductors, a mechanical support and an electrical connection for each conductor at a single point thereof, the means providing for the electrical connections being entirely independent of the mechanical supports.

4. A cabinet for electrical mechanisms, having a cable conductor, a mechanical support and an electrical connection at a single point on said conductor, said support having insulating members, and conducting members enclosed therein entirely independent of the mechanical support.

5. A cabinet for electrical mechanisms, having a cable conductor, a mechanical support and an electrical connection at a single point on said conductor, the means providing for the electrical connection being entirely independent of the mechanical support, and the said support having upwardly projecting portions of insulating material.

6. A cabinet for electrical mechanisms, having mounted therein a pair of insulating blocks, a pair of conducting blocks enclosed in the insulating blocks, said conducting blocks having portions shaped to grip an electric cable, means for causing the conducting blocks to clamp a cable, and independent means for electrically connecting the conducting blocks with electrical mechanism mounted in the cabinet.

In testimony whereof I have affixed my signature.

JOHN W. HOOLEY.